United States Patent
Rajkumar et al.

(10) Patent No.: US 8,433,724 B2
(45) Date of Patent: *Apr. 30, 2013

(54) SYSTEM USING CONTENT GENERATOR FOR DYNAMICALLY REGENERATING ONE OR MORE FRAGMENTS OF WEB PAGE BASED ON NOTIFICATION OF CONTENT CHANGE

(75) Inventors: N. Isaac Rajkumar, Hyderabad (IN); Mark McCalister, Austin, TX (US); Expeditus Bolanus, Pflugerville, TX (US); Peter Hale, San Francisco, CA (US); Mark Martin, Cedar Park, TX (US); Richard Nemec, North Andover, MA (US); Puhong You, Cedar Park, TX (US); Daun DeFrance, Austin, TX (US); Ching-Fu Chang, Austin, TX (US); Priya Reddy, Austin, TX (US); Ladislav Kis, North Andover, MA (US); Robert L. Patterson, Leawood, KS (US); Tony Zgarba, Round Rock, TX (US); Jeffrey M. Collins, San Mateo, CA (US); Michael C. Tulkoff, Austin, TX (US); Miles Chaston, San Francisco, CA (US); Dean Moses, Berkeley, CA (US); John Petersen, San Francisco, CA (US); Ian Stahl, Austin, TX (US); Lara Long, Mountainview, CA (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,041

(22) Filed: Aug. 3, 2012
(Under 37 CFR 1.47)

(65) Prior Publication Data
US 2012/0303765 A1 Nov. 29, 2012

Related U.S. Application Data

(63) Continuation of application No. 12/900,057, filed on Oct. 7, 2010, now Pat. No. 8,260,802, which is a continuation of application No. 11/444,020, filed on May 31, 2006, now Pat. No. 7,860,820.

(60) Provisional application No. 60/686,089, filed on May 31, 2005.

(51) Int. Cl.
*G06F 7/00* (2006.01)

(52) U.S. Cl.
USPC ............ 707/769; 707/737; 709/203; 709/219

(58) Field of Classification Search ................. 709/203, 709/219, 213, 246, 206; 707/513, 769, 737; 705/39
See application file for complete search history.

(56) References Cited

U.S. PATENT DOCUMENTS

| 6,029,175 A | 2/2000 | Chow |
| 6,591,266 B1 | 7/2003 | Li et al. |

(Continued)

FOREIGN PATENT DOCUMENTS

WO    WO0133388 A2    5/2001

OTHER PUBLICATIONS

Office Action issued in U.S. Appl. No. 11/444,023, mailed Apr. 30, 2008, 11 pages.

(Continued)

*Primary Examiner* — Le H Luu
(74) *Attorney, Agent, or Firm* — Sprinkle IP Law Group (57) ABSTRACT

Disclosed herein are embodiments of a system and method for the provisioning of dynamically generated content. One embodiment can interface a content delivery system and a content management system at the fragment level. Depending upon how a page is organized, a fragment may refer to a block within the page, a portion of the page, or a content item presented on the page. When a content item is updated and published onto the content management system, one embodiment of the invention can operate to track dependencies of managed pages and invalidate/validate fragment(s) affected by the change(s) accordingly. The updated fragment(s) may then be dynamically assembled on-the-fly or on-demand. The updated fragment(s) may or may not be cached. In this way, changes made to a piece of content can be reflected in all pages which utilize this content almost simultaneously with the changes to the content itself.

20 Claims, 6 Drawing Sheets

U.S. PATENT DOCUMENTS

| | | |
|---|---|---|
| 6,622,168 B1 | 9/2003 | Datta |
| 7,051,084 B1 | 5/2006 | Hayton et al. |
| 7,096,418 B1 | 8/2006 | Singhal et al. |
| 7,194,678 B1 | 3/2007 | Koike et al. |
| 7,392,348 B2 | 6/2008 | Dumont |
| 7,860,820 B1 | 12/2010 | Rajkumar |
| 8,260,802 B2 | 9/2012 | Rajkumar et al. |
| 2001/0034771 A1 | 10/2001 | Hutsch et al. |
| 2002/0010798 A1 | 1/2002 | Ben-Shaul et al. |
| 2002/0065976 A1 | 5/2002 | Kahn |
| 2002/0111992 A1* | 8/2002 | Copeland et al. ............. 709/203 |
| 2002/0112032 A1* | 8/2002 | Martin et al. ................. 709/219 |
| 2002/0138511 A1 | 9/2002 | Psounis et al. |
| 2002/0138513 A1 | 9/2002 | Korotney |
| 2002/0156702 A1 | 10/2002 | Kane |
| 2002/0188633 A1 | 12/2002 | Davis et al. |
| 2003/0004998 A1* | 1/2003 | Datta ............................ 707/513 |
| 2003/0120593 A1* | 6/2003 | Bansal et al. ................... 705/39 |
| 2003/0135464 A1 | 7/2003 | Mourad et al. |
| 2003/0187935 A1* | 10/2003 | Agarwalla et al. ............ 709/206 |
| 2003/0188021 A1* | 10/2003 | Challenger et al. ........... 709/246 |
| 2003/0217117 A1 | 11/2003 | Dan et al. |
| 2004/0015476 A1 | 1/2004 | Twaddle |
| 2004/0117739 A1 | 6/2004 | Challenger et al. |
| 2004/0162886 A1* | 8/2004 | Ims et al. ....................... 709/213 |
| 2005/0198120 A1 | 9/2005 | Reshef et al. |
| 2005/0204281 A1 | 9/2005 | Choate |
| 2006/0026067 A1 | 2/2006 | Nicholas et al. |
| 2006/0031404 A1 | 2/2006 | Kassab |
| 2006/0112079 A1 | 5/2006 | Holt et al. |
| 2006/0129632 A1 | 6/2006 | Blume et al. |
| 2006/0161881 A1 | 7/2006 | Saad et al. |
| 2007/0226621 A1 | 9/2007 | Dayan et al. |
| 2009/0150518 A1 | 6/2009 | Lewin |

OTHER PUBLICATIONS

Office Action issued in U.S. Appl. No. 11/444,023, mailed Oct. 20, 2008, 15 pages.
Office Action issued in U.S. Appl. No. 11/444,023, mailed Mar. 24, 2009, 15 pages.
Office Action issued in U.S. Appl. No. 11/444,020, mailed Jun. 10, 2009, 6 pages.
Office Action issued in U.S. Appl. No. 11/444,023, mailed Sep. 21, 2009, 16 pages.
Office Action issued in U.S. Appl. No. 11/444,020, mailed Nov. 13, 2009, 7 pages.
Office Action issued in U.S. Appl. No. 11/444,023, mailed Feb. 23, 2010, 21 pages.
Office Action issued in U.S. Appl. No. 11/444,023, mailed Aug. 16, 2010, 27 pages.
Office Action issued in U.S. Appl. No. 11/444,023, mailed Dec. 13, 2010, 23 pages.
Office Action issued in U.S. Appl. No. 11/444,023, mailed May 12, 2011, 22 pages.
Office Action issued in U.S. Appl. No. 12/900,057, mailed Aug. 03, 2011, 8 pages.
Office Action issued in U.S. Appl. No. 11/444,023, mailed Oct. 24, 2011, 15 pages.
Notice of Allowance issued in U.S. Appl. No. 12/900,057, mailed Jan. 20, 2011, 7 pages.
Office Action issued in U.S. Appl. No. 11/444,023, mailed Mar. 28, 2012, 15 pages.
Notice of Allowance issued in U.S. Appl. No. 12/900,057, mailed Apr. 27, 2012, 1 page.

* cited by examiner

FIG. 6

SYSTEM USING CONTENT GENERATOR FOR DYNAMICALLY REGENERATING ONE OR MORE FRAGMENTS OF WEB PAGE BASED ON NOTIFICATION OF CONTENT CHANGE

CROSS-REFERENCE TO RELATED APPLICATIONS

This is a continuation of U.S. patent application Ser. No. 12/900,057, filed Oct. 7, 2010, now U.S. Pat. No. 8,260,802, entitled "A SYSTEM USING CONTENT GENERATOR FOR DYNAMICALLY REGENERATING ONE OR MORE FRAGMENTS OF WEB PAGE BASED ON NOTIFICATION OF CONTENT CHANGE," which is a continuation of U.S. patent application Ser. No. 11/444,020, filed May 31, 2006, now U.S. Pat. No. 7,860,820, issued Dec. 28, 2010, entitled "A SYSTEM USING CONTENT GENERATOR FOR DYNAMICALLY REGENERATING ONE OR MORE FRAGMENTS OF WEB PAGE BASED ON NOTIFICATION OF CONTENT CHANGE," which claims priority from Provisional Patent Application No. 60/686,089, filed May 31, 2005, entitled "SYSTEM AND METHOD FOR THE PROVISIONING OF DYNAMICALLY GENERATED CONTENT." This application also relates to co-pending U.S. patent application Ser. No. 11/444,023, filed May 31, 2006, entitled "SYSTEM AND METHOD FOR THE DYNAMIC PROVISIONING OF STATIC CONTENT." All applications listed in this paragraph are fully incorporated herein by reference for all purposes.

TECHNICAL FIELD

The invention relates in general to the delivery of content, and more particularly, to methods and systems for the provisioning of dynamic content for network delivery.

BACKGROUND OF THE RELATED ART

With the proliferation of information on the Internet, it is becoming increasingly difficult to prepare and deliver content to users in an efficient and timely manner. Current content delivery systems generally employ two content publishing techniques. The first one involves the dynamic publication of static content (e.g., web pages) to the web tier. Typically, most web sites are produced by in-sequence publishing actions. For example, a set of web pages can be generated on a chronological basis by an application server and made available to a web server for appropriate actions. In other words, to implement a web site, a set of web pages may be produced at an application layer and published at a presentation layer. These layers are part of the seven operating system (OS) layers known in the art.

In response to a user request, the web server may operate to deliver one or more of web pages to the user. If that user elects to "refresh" the delivered content (e.g., by clicking a "Refresh" button on a browser application's menu), the same content may be delivered to the user again. All of the web pages implementing a web site can be updated as needed or reproduced at some regular interval to incorporate changes in the content. However, all of the web pages implementing the web site may have to be reproduced. Moreover, changes made to the content may only be taken into account at the intervals at which the web pages are reproduced. Thus, web pages delivered to a user may, for a period of time, contain stale content. In addition, reproducing web pages for each and every web site affected by certain changes may require a long period of time.

Another content publishing technique involves portal applications or standard Java® service or Server Page (JSP) applications. These applications typically have dynamic scripting capability that can work in tandem with hypertext markup language (HTML) code to separate the logic of a page from its static elements (e.g., the actual design layout and display of the page). The extracted portion of the page can then be used to make dynamic database queries and assemble pages on-the-fly accordingly.

Within this disclosure, term "portal" generally refers to a gateway that is or can be a starting site, a home site, or an anchor site for networked users visiting the World Wide Web (WWW or web). Examples of portals include www.yahoo.com, www.cnet.com, www.microsoft.com, and www.aol.com. A portal is a kind of web site with a rich navigation structure of internal links within the same site and external links to other sites. In some cases, a company may provide one or more portals connecting the company's intranet to the web. Currently, most portals adopt a style of categorizing content with a text-intensive, fast loading web page. Services provided by portals or portal sites typically include a directory of web sites or links, a search facility to search for other sites, news, weather, email, stock quotes, maps, and so on.

A portal site may comprise portlets or portal pages through which a plurality of channels and sub-channels of content can be presented to end users. Large scale portal sites capable of handling a high volume of content are typically built with a few "page templates" that can be reused over and over again to display content. For example, in response to a user request, a portal page may be assembled on-the-fly based on a page template. In this manner, content displayed on the portal site can remain up-to-date and not all pages of the portal site must be reproduced.

Web sites and portal sites, particularly large scale portal sites, are generally produced and managed at the server side, transparent to end users. While content delivery systems employing JSP or portal applications offer many advantages, there is no automated process to coordinate update activities in the backend. More specifically, update activities made by and at a content delivery system may not be automatically propagated to a content management system. Conversely, update activities made by and at the content management system may not be automatically propagated to the content delivery system.

Therefore, there is a need for a new system and method for the dynamic provisioning of static content for network delivery. Embodiments of the invention can address this need and more.

SUMMARY OF THE INVENTION

The present invention is directed to interfacing a content delivery system and a content management system in an automated, efficient manner, addressing the technical challenges described above. More specifically, embodiments of the systems and methods described herein can provide mechanisms for refreshing information presented on the content delivery system based on information published on the content management system. Embodiments of the invention described herein can be useful in dynamically provisioning and delivering dynamically generated static as well as dynamic content.

In one embodiment, a static solution involves interfacing a content delivery system and a content management system at the page level. Within this disclosure, the term "page" refers to a web page, a portal page, or the like. With the static solution, updating a piece of content (e.g., an article or a content item) can cause the dynamic reproduction of all pages associated with the piece of content.

In one embodiment, a dynamic solution involves interfacing the content delivery system and a content management system at a sub-page level. In this case, updating a piece of dynamically generated content may cause the dynamic reproduction of one or more fragments associated with the piece of content. The updated fragment(s) may then be dynamically assembled on-the-fly or on-demand. The updated fragment(s) may or may not be cached. In this way, changes made to a piece of dynamically generated content can be reflected in all pages which utilize this content almost simultaneously with the changes to the content itself.

In some embodiments, dependencies between a page, portion(s) or fragment(s) of the page, and the associated, underlying content item(s) can be tracked in a timely, accurate manner. As an example, a piece of content (e.g., an HTML document, an article, a link, a content item, etc.) may appear on multiple web pages and may be in various forms (e.g., an abbreviated version of an article, an abstract or summary of the article, a recitation of the article, etc.). When that content item is updated and published onto a content management system, one embodiment of the invention can operate to track dependencies of these web pages and invalidate or validate the fragment or fragments affected by the change or changes accordingly. Within this disclosure, the term "fragment" generally refers to a piece of data or a unit of content and may vary depending upon how the page is organized. A fragment may refer to a block within a page, a portion of a page, or a content item presented on a page (e.g., an HTML file, a uniform resource link, etc.). An exemplary content item can be a piece of article.

In some embodiments, a cache can be employed in managing the dependencies and association of highly dynamic data (i.e., fresh content). In one embodiment, the cache may implement a lookup mechanism in which a fast search can be done based on a key. In one embodiment, system attributes such as display format, channel, site, item, locale, user, group, class, etc. can be used to compute the key, which may or may not be hashed. In one embodiment, the term "locale" refers to where a user is located and can be sensitive to the locale of a client and/or a server. In one embodiment, if a match (e.g., a page, a fragment, etc.) is found in the cache, it is sent to a content delivery system for rendering. If not, a new page or fragment may be generated and cached. The cache can be refreshed externally from a content manager (e.g., changes to published content can trigger refreshing) and internally from a cache manager (e.g., scheduled refreshing, administrative flushing, etc.).

Embodiments of the invention can provide many advantages. For example, the static solution allows changes to static content managed by a content management system be dynamically made all at once. Dynamically provisioned static content can then be pushed out to a content delivery system for publishing to the web tier in an automated, efficient manner, thus saving implementation and deployment costs. The dynamic solution allows dependencies among constituents of a site to be tracked dynamically. Thus, only fragments that are affected by changes would need to be updated, further saving time and resources. Embodiments of the invention may be particularly useful for portal applications. Portals or portal sites are typically designed to provide a large volume of business users highly secure and personalized access to a range of content behind a firewall on internal networks (e.g., intranets) and/or in secure external networks (e.g., virtual private networks). The automated updating process disclosed herein can further reduce risks associated with portal ownership, implementation, and deployment.

Other objects and advantages of the present invention will become apparent to one skilled in the art upon reading and understanding the detailed description of the preferred embodiments described herein with reference to the following drawings.

DETAILED DESCRIPTION

The invention and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the invention in detail. It should be understood, however, that the detailed description and the specific examples, while indicating the preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
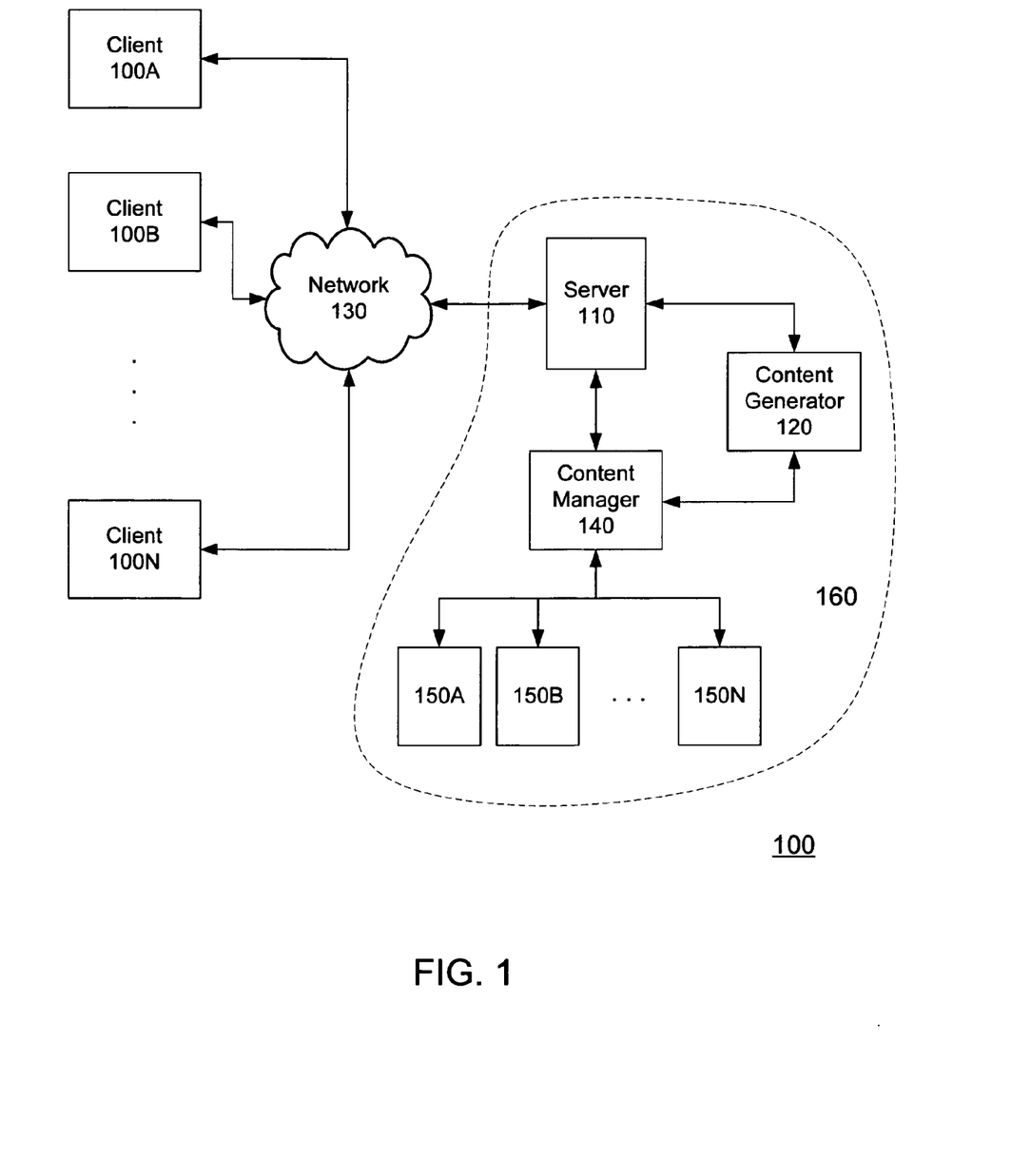
FIG. 1 is a simplified diagrammatic representation of exemplary system architecture in which embodiments of the present invention may be implemented.

FIG. 1 is a simplified representation of system architecture in which specific embodiments of the present invention may be implemented. As one skilled in the art can appreciate, the systems and methods of the present invention may be utilized with respect to a wide variety of other architectures. Thus, the exemplary architecture shown and described with respect to FIG. 1 is meant to be illustrative and not limiting. Additionally, it will be understood that, though components of the exemplary architecture are described and pictured individually, the functionality of the elements of the exemplary architecture may be combined into one or more pieces of software or hardware.

In FIG. 1, system architecture 100 comprises network 130 and network 160. Network 130 can be characterized as an external network and network 160 can be characterized as an internal network. The Internet might be an example of an external network and a company's intranet might be an example of an internal network. Each network in system architecture 100 can be bi-directionally coupled to a variety of networked systems, devices, repositories, etc.

In the simplified configuration shown in FIG. 1, network 130 is bi-directionally coupled to a plurality of client machines 100A . . . N and at least one server 110. Virtually any piece of hardware or electronic device capable of running client software and communicating with server 110 can be considered a client machine. For the sake of simplicity, client machines 100A . . . N are referred to hereinafter as client 100.

As an example, client 100 may include a central processing unit (CPU), read-only memory (ROM), random access memory (RAM), hard drive (HD) or non-volatile memory, and input/output (I/O) device(s). An I/O device may be a keyboard, monitor, printer, electronic pointing device (e.g., mouse, trackball, etc.), or the like. The hardware configuration of client 100 can be representative to other devices and computers alike coupled to network 130 (e.g., desktop computers, laptop computers, personal digital assistants, handheld computers, cellular phones, and any electronic devices capable of storing and processing information and network communication).

In the example shown in FIG. 1, server 110, content generator 120, content manager 140, and devices or stations 150A . . . N reside in network 160. In one embodiment, server 110 embodies a content delivery system (CDS), which is in bi-directional communication with content generator or content generation system (CGS) 120 and content manager or content management system (CMS) 140. CDS, CGS, and CMS may be implemented on one or more server computers, each of which may comprise at least one processor, at least one persistent memory, at least one volatile memory, and a plurality of I/O ports. CDS, CGS, and CMS may have a plurality of software components residing thereon implementing content delivery, page generation, and content management.

For the sake of simplicity, hardware components (e.g., CPU, ROM, RAM, HD, I/O, etc.) are not illustrated in FIG. 1. Embodiments of the invention may be implemented in suitable software code (i.e., computer-executable instructions). As one skilled in the art can appreciate, computer-executable instructions and data implementing embodiments of the invention may be carried on various types of computer-readable media, including volatile and non-volatile computer memories and storage devices (e.g., ROM, RAM, HD, direct access storage device arrays, magnetic tapes, floppy diskettes, optical storage devices, etc.). In an illustrative embodiment of the invention, the computer-executable instructions may be written in Java® or any appropriate computer language. In embodiments of the invention, some or all of the software components may reside on a single server computer or on any combination of separate server computers. For example, software components implementing content delivery system 110 and content management system 140 could reside on the same server computer.

A processor implementing embodiments of the invention may have internal and/or external access to a variety of computer-readable media. Each CDS, CGS, and CMS may be bi-directionally coupled to one or more databases. Each database may contain data objects and metadata regarding those objects. A database can be implemented in a computer readable medium as known in the art.

Individuals using network 160 may access CDS, CGS, and CMS through various means such as desktop computers, laptops, workstations, etc. These individuals may include content producers, content developers, content editors, content reviewers, webmasters, information technology specialists, and the like.

In addition to FIG. 1, many other configurations are possible. For example, within each CDS 110 and CMS 140, a plurality of computers may be interconnected to each other over an internal network or a combination of internal and external networks. Moreover, CDS 110, CMS 140, and CGS 120 may be part of a network site (e.g., web site, portal site, etc.).

Communications between any of the computers described above may be accomplished in various ways, including wired and wireless. As one skilled in the art can appreciate, network communications can include electronic signals, optical signals, radio-frequency signals, and other signals as well as combinations thereof.

Within this disclosure, content may be an application or piece of data provided by a web site such as an HTML page, Java application, or the like. In many cases, one piece of content may be assembled from other pieces of content chosen based on a request initiated by a user of the web site. For example, client devices 100 may be utilized by an end user to communicate a request for content provided by a web site over network 130. This request may be in the form of an HTTP request containing a URL as is known in the art. The request may arrive at server 110. In response to the request, content delivery system residing at server 110 (hereinafter referred to as "content delivery system 110") may operate to communicate a page or piece of content responsive to this request to client device 100. Additionally, content delivery system 110 may pass the request to content generation system 120. Content generation system 120 may operate to generate a new page or piece of content that is responsive to this request and return the dynamically generated content to content delivery system 110 for delivery to client device 100.

In one embodiment, content generation system 120 may generate a set of content or pages and make them accessible to content delivery system 110. In response to a request, content delivery system 110 may dynamically deliver all or a portion of the previously generated content to client device 100. For example, in response to a particular user request from client device 100A, content delivery system 110 may obtain a copy of a piece of content previously generated by content generation system 120 which most closely matches the user request and deliver it to client device 100A. This implementation may be especially useful for a high volume web site which does not require a high degree of personalization of web pages to a particular user.

Figure 2:
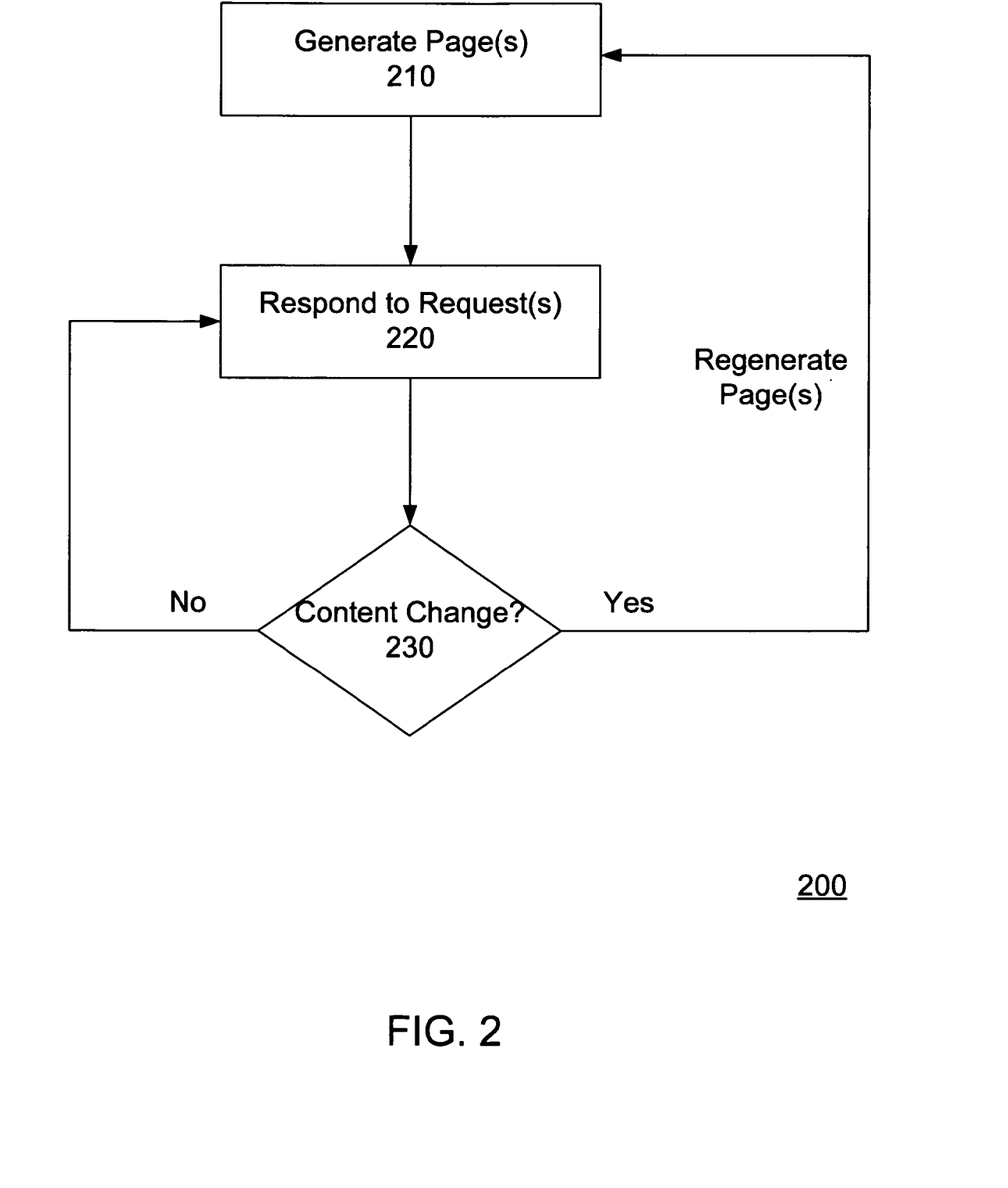
FIG. 2 is a simplified flow diagram illustrating an exemplary static solution for the dynamic provisioning of static content, implementing embodiments of the present invention.

FIG. 2 depicts a simplified flow diagram 200 for the dynamic provisioning of content according to one embodiment of the invention. At step 210, a set of pages may be generated based on content information published on content management system 140. These pages may then be utilized in responding to requests at step 220. If content changes at step 230, one or more of the pages may be dynamically regenerated. Multiple pages may be regenerated even when a single content item has been changed, based on the implicit or explicit dependencies that exist among the involved pages. Within this disclosure, a content item refers to a data object defined by a specific content type. A content type represents the structured specification of a content item and contains metadata and a set of relations which contain attribute definitions. A content item or content instance may contain and reference actual repository data. Repository data can exist in a database table, a filesystem, or any other system that can be reached via integration services.

In one embodiment, content generation system 120 may utilize a set of templates for the assembly or generation of a page or set of pages. Within this disclosure, a template refers to a defined page that can exist apart from specific site navigation. A template may contain special portlets that understand object context in order to do content display and rendering. A template can also be cached. Within this disclosure, context refers to a specific object identifier used to key content selection in a portlet on a template. Content selection refers to the act of querying deployed or repository content based on a set of selectable criteria. Content selection may be used in conjunction with personalization rules. Deployment is a content management function and refers to the act of distributing content and metadata from a management repository.

These templates may be created or defined by the administrator of a site or portal, and may define a set of content items to be incorporated into an assembled page. Each of these templates may have one or more variables upon which these templates may be assembled. Thus, a particular page results if a page is assembled using a particular template with a variable set to a particular value. If another page is assembled from the same template and all parameters, attributes, and so on remain the same, but with a different value for the same variable, the resulting page may be different.

Pages implementing a site may be assembled or otherwise generated from a set of templates based on a set of permutations of particular variables associated therewith. This generation process results in a set of generated or assembled web pages. These assembled pages may then be provided to content delivery system 110. One or more of these pre-generated pages may then be served by content delivery system 110 in response to a request from a user as described above. These particular variables may be a subset of a larger set of variables intended to allow the personalization of pages generated from the template. The other variables may either be ignored or held constant while pages are generated from the template using the permutations of the particular variables.

In one embodiment, there may be three variables on which the pages are to be generated: Channel (i.e., location in the navigation graph of the site/portal), Locale (e.g., American, English, French, etc.) and Display format (e.g., a descriptor that can differentiate templates associated to the same content type on a site). As will be described in details with reference to FIG. 5, a site and hence its content can be organized through Channels.

In one embodiment, content generation system 120 may be sensitive to changes in content pertinent to the pages that have been generated and delivered or made accessible to content delivery system 110. Specifically, content generation system 120 may operate to take appropriate action(s) based upon changes related to provisioned content. For example, content management system 140 may store content and may be linked to a variety of devices 150 such as databases, servers, etc. that store and/or produce content. In one embodiment, content management system 140 is responsible for managing all content produced and/or stored in network 160. If a piece of content changes, this change may be detected (e.g., via a listener embedded in device 150) or communicated to content management system 140. Content management system 140 may then communicate this change to content generation system 120.

In response to this notification and to account for this change, content generation system 120 may dynamically re-generate one or more of the pages which had been previously generated and delivered or made accessible to content delivery system 110. As an example, suppose that a link to a page or content is included on one of the twenty-seven web pages rendered in the above example. In one embodiment, this linked page or content resides on content management system 140. If this page or content is removed from content management system 140, content management system 140 may notify content generation system 120 of the removal. In response to this notification, content generation system 120 may re-generate the page that linked to this content or page and deliver this newly generated page to content delivery system 110 to replace the old page. Embodiments of the invention implementing the above-described static solution (i.e., the dynamic provisioning of static content) may be particularly useful for almost any alteration of content pertinent to web pages generated by content generation system 120.

In some embodiments, when content delivery system 110 receives a request for content (e.g., previously generated web pages), it may pass the request through to content generation system 120. In response, content generation system 120 may dynamically create a page that is personalized based on the request. These pages may be assembled from a set of content managed by content management system 140 or any other content, all of which may change independently of one another. Embodiments of the invention implementing the dynamic provisioning of static content at the page level may be particularly useful when a large portion of the content to be presented on web pages will change frequently, when a large degree of personalization of web pages is desired (e.g., via user requests), or when it is desired to personalize the delivered web pages based upon a wide variety of context variables.

Figure 3:
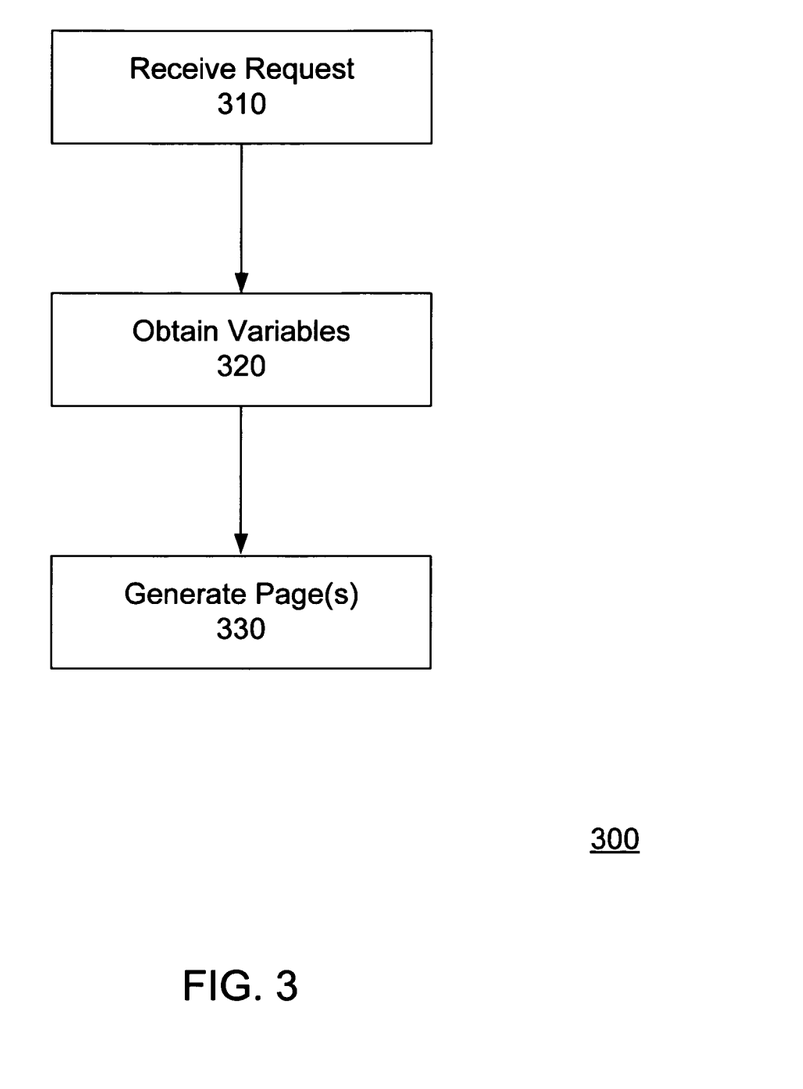
FIG. 3 is a simplified flow diagram illustrating an exemplary dynamic solution for the provisioning of dynamically generated content, implementing embodiments of the present invention.

FIG. 3 depicts a simplified flow diagram 300 that further exemplifies the dynamic solution for provisioning content in a network environment. At step 310, a request is received. At step 320, variables related to the request may then be obtained from the request or sources other than the request. Based on these variables, a page or content may be generated in response to the request at step 330.

More specifically, upon receiving a request, content generation system 120 may generate a page or content from a template based on a set of variables associated with the template. The values for these variables may be based at least in part on the request. The assembled page or generated content may then be returned to content delivery system 110 for delivery to the client 100 from which the request was issued. In particular, content generation system 120 may take the values of context variables from the request and other environmental variables (e.g., time, a user's membership in a previously defined group, or a category of users, etc.) to assemble content or a page which may be specifically tailored to a particular user request at the time the request is received at content generation system 120. In one embodiment, the context variables or identifiers in the request may allow content generation system 120 to select managed content or other content for inclusion in the web page assembled from the template.

Content generation system 120 may also cache rendered content such that the rendered content may be utilized in any page generated from any of the templates utilized by content generation system 120. For example, suppose an article is stored on or accessible by content management system 140, and it is desired to include this article (along with other content) in a page being assembled by content generation system 120 for delivery to end user(s). This article may be rendered for presentation in the generated page. As a specific example, the article may be text stored in a database. To render the article, however, the text may be encapsulated with some HTML code so that the article may appear a certain way (e.g., style, font, text size) in the page being generated and delivered to a client machine and displayed via a graphical user interface thereof.

What is more, this article may appear in conjunction with one or more pages (e.g., in implementing a portal site). To facilitate the inclusion of this article across these pages, the rendered version of the article may be cached. Thus, when each of these pages is assembled for delivery to the user, the rendered article may be included from the cache, reducing the time required for the assembly of each of these pages.

Additionally, to make sure that the most recent content is being delivered to a user in conjunction with these assembled pages, caching parameters may be stored along with the rendered content. As one skilled in the art can appreciate, these caching parameters may include meta-data associated with the rendered content, or almost any other type of data imaginable. In one embodiment, content management system 140 may operate to notify content generation system 120 when the content changes on content management system 140 or devices 150. This can be done, for example, by using data related to one or more of the caching parameters stored in the cache in conjunction with the content. Thus, when content generation system 120 is informed that cached content has changed by content management system 140, the next time a web page which includes this content is requested from content generation system 120, this content may be re-rendered and re-cached. In this manner, content which has changed may be updated without having to update any other content which is on the same web page and which has not changed.

In some cases, however, external content may be needed in assembling web pages for delivery to end user(s). External content refers to content that is not managed by content management system 140. This external content, however, may also be rendered, included in a page assembled in response to a user request and the rendered version of this external content placed in a cache. In this case, to make sure that rendered external content stored in the cache is updated at a regular interval, a timing mechanism may be associated with the rendered external content in the cache. This timing mechanism may trigger the expiration of the rendered external content and the expulsion of the rendered external content from the cache, or may alternatively trigger a re-fetch and re-rendering of the external content, which may then replace the older version of the rendered external content in the cache. Such a timing mechanism may be an internal, built-in feature of the cache. Alternatively, the cache may provide a means for an external system to indicate when such external content is no longer valid, which similarly can trigger the expulsion of the cached content and/or automatic re-fetch and re-rendering of the external content.

Figure 4:
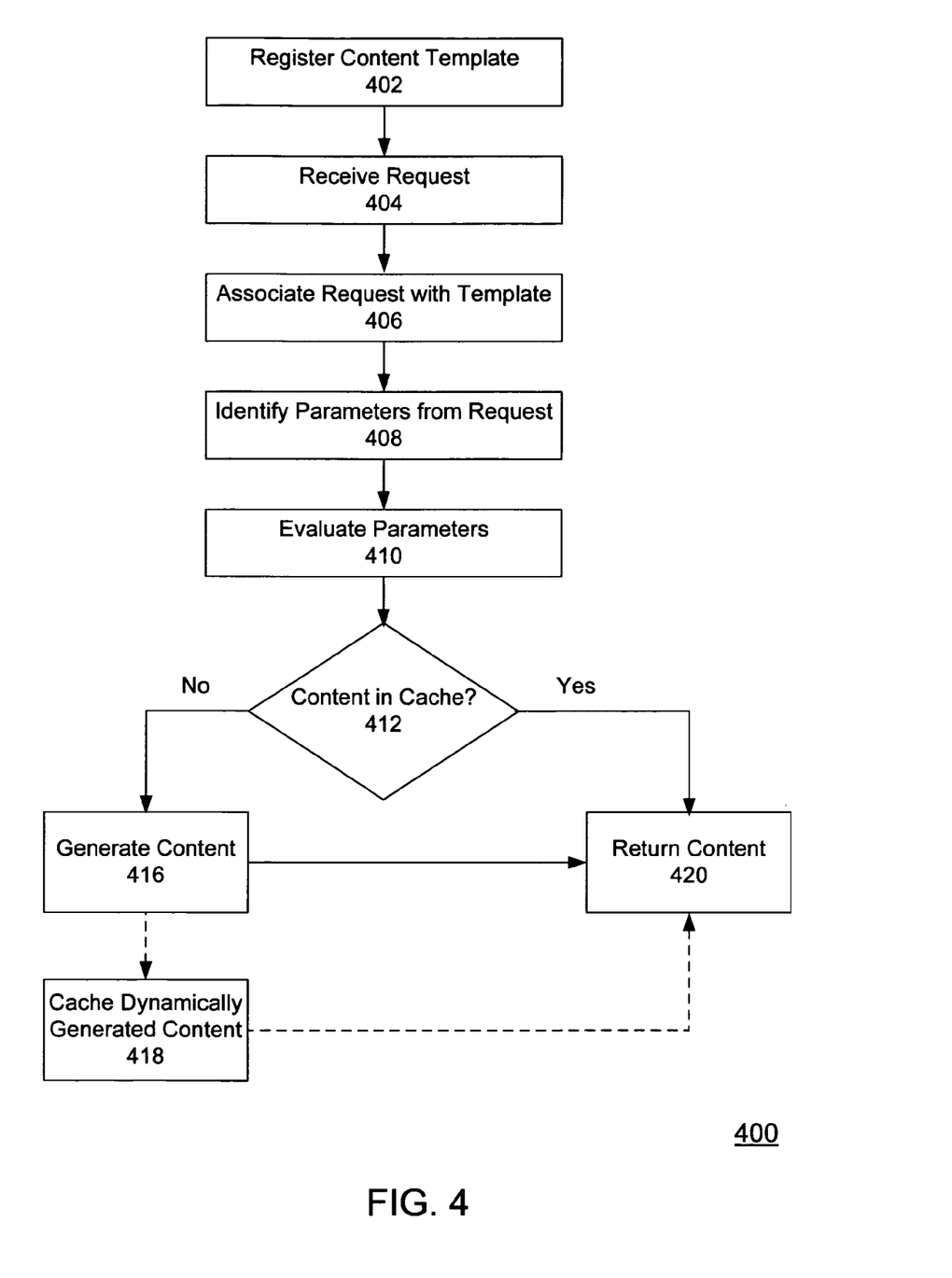
FIG. 4 is a simplified flow diagram illustrating an exemplary dynamic solution in which a caching mechanism is employed for the provisioning of dynamically generated content, implementing embodiments of the present invention.

FIG. 4 depicts a simplified flow diagram 400 illustrating exemplary embodiments of the invention utilizing a caching framework. In FIG. 4, one embodiment of a method implementing flow 400 may include the steps of registering a content template pertaining to a piece of content (block 402), receiving a request for content (block 404), associating the request with an appropriate content template (block 406), identifying parameters associated with the content template from the request (block 408), evaluating these parameters (block 410), and, based on the evaluation, determining whether any content responsive to the request is located in the cache (block 412). If responsive content is not located in the cache framework, the method may further include a step of generating (e.g., via content generation system 120) responsive content (block 416) and optionally caching this dynamically generated responsive content along with associated metadata (block 418). Dynamically generated and/or cached responsive content may then be returned to the requestor (block 420).

As one skilled in the art can appreciate, not all of the activities described in the process flow diagram 400 are required. Moreover, an element within a specific activity may not be required and further activities may be performed in addition to those illustrated. Additionally, the order in which the activities are listed is not necessarily the order in which they are performed. After reading this specification, a person of ordinary skill in the art will be capable of determining which activities and orderings best suit any particular objective.

When a request comes in from a client computer (e.g., client 100), this request contains a URL which references a particular piece of content residing on an application server. As is known, an application server can be in many forms including Perl scripts, Java programs, C/C++ programs, active server pages, or a combination thereof. As described above, there are many possible ways to implement content delivery system 110, content generation system 120, and content management system 140. For example, server 110 could be a web server programmed to operate all three software systems (i.e., content delivery, content generation, and content management). Alternatively, content generation system 120 and content management system 140 may be embodied in one or more application server computers separate from web server 110.

The requested piece of content may be assembled from various constituent subparts and returned to client 100 based upon specifics contained in the request. Consequently, a template may be formed from a piece of content which contains metadata regarding certain aspects of a request which may pertain to assembling the specifics and subparts of a particular piece of content, as discussed above. In one embodiment, when a new piece of content, or a new application server such as a JSP, becomes part of a web site, a template containing metadata pertinent to that piece of content or application server may be registered with a caching framework (block 402). In one embodiment, the caching framework may contain one or more caches. For example, a first cache may reside on and/or is accessible by content delivery system 110 and one cache may reside on and/or is accessible by content generation system 120. The first cache may store pre-generated static content (e.g., web pages) that can be delivered to end users dynamically in response to a user request. The second cache may store information relevant for the dynamic generation of template-based dynamic content. In one embodiment, the caching framework may implement a cache in communication with a web server (e.g., server 110) and an application server (e.g., content generation system 120).

After a request is received at step 404 (e.g., by web server 110), this request may be associated with a template (block 406). As an example, a request issued from client 100 usually contains a URL which may refer to a specific piece of content residing on content management system 140, along with associated data pertaining to how a user on client 100 would like the requested content assembled. In accordance with this request, software implementing the caching framework may operate to identify a particular piece of content that is to be assembled by comparing information derived from the URL of an incoming request with templates registered for various pieces of content in network 160. The template which is identified to be responsive to the requested content is then associated with the incoming request (block 406).

The identified template, in turn, may contain a list of parameters which are helpful in tailoring the assembly of this content to the incoming request. The metadata associated with the template corresponding to the requested content may allow identification of parameters to which a particular piece of content is sensitive (block 408). These parameters may include form data, header data, session, request, page-context, browser-features and other such data which will be obvious to those of ordinary skill in the art. Software implementing the caching framework may further operate to parse the incoming request for information relating to the parameters indicated by the template. In one embodiment, the parsed and/or extracted information, along with the associated template metadata, may be communicated to one or more software modules within the caching framework for evaluation at step 410. Evaluation software modules may operate to analyze the extracted information and associated template metadata and return several pieces of data to a web server (i.e., content delivery system 110) and/or application server (i.e., content generation system 120). The returned data may include a status which indicates whether the web server should map the incoming request from client 100 to a cache file for static content or let the request go through to application server for dynamic evaluation and content generation (block 416). In other words, the returned data from the evaluation step at 410 can affect whether the request should be served with pre-generated content (e.g., from the cache file). As an example, if an evaluation software module sees a certain cookie, the request may be determined to be subject to dynamic evaluation.

The returned data may include a string pertaining to the parameter for which a software module is responsible. For example, a query string module may return the value "city=Austin&state=TX", while a browser capabilities module may return the value "IE6 JavaScript Frames" in the case where the browser initiating the request is Internet Explorer Version 6. Other data which may be returned may include request metadata which is to be stored with the cached content so as to facilitate the regeneration of the request, resulting in an associated piece of cached content. Once the request has been evaluated (block 410) and responsive content identified (block 412) or dynamically generated (block 416), static content (e.g., full web page or pages) or dynamically generated content (e.g., fragments of a web page or pages) responsive to the incoming request may be returned to the user on client 100 (block 420).

Content cached in the caching framework may be stored with corresponding metadata for efficient management of the cached content. This metadata may include attributes pertaining to the template which corresponds to the content, and attributes which pertains to the request which resulted in the content being cached. This metadata may allow cached content to be automatically updated without receiving an identical request for the content. It will be recognized by those of ordinary skill in the art that other types of data may be stored in a caching framework implementing flow 400 which will allow the automatic update of cached content.

A caching framework implementing embodiments of the invention may implement a lookup mechanism in which a fast search can be done based on a key. As described above, system attributes which can be used to compute the key may include Channel, Site, Item, etc. The term "channel" is intended to mean a hierarchical navigation of content on a site or portal. A channel can also be used to display content in applications.

Figure 5:
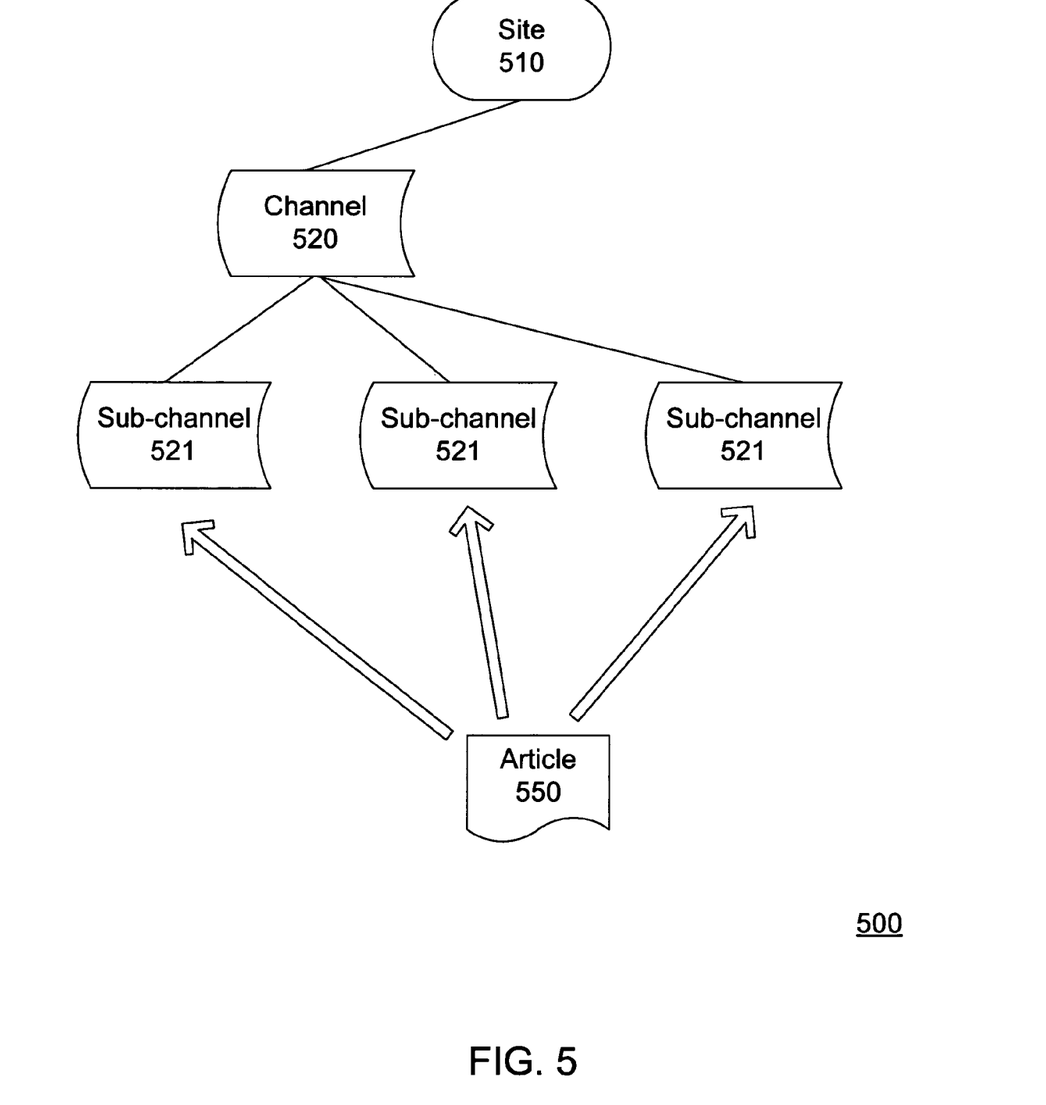
FIG. 5 is a simplified diagrammatic representation of an exemplary site organization, showing possible association(s) between a piece of content and constituents of the site, according to one embodiment of the invention.

FIG. 5 is a simplified diagrammatic representation of an exemplary site organization tree 500, showing possible associations between a piece of content (e.g., Article 550) and constituents of a site (e.g., Site 510), according to one embodiment of the invention. In this example, constituents of Site 510 include Channel 520 comprising a plurality of sub-channels 521. In one embodiment, Site 510 may comprise a plurality of portal pages through which one or more Channel 520 and sub-channels 521 of content (e.g., article 550) can be presented to end users.

In one embodiment, there may be three variables on which portal pages can be generated to implement site 510: Channel, Locale, and Display format. Channel usually refers to a location in the navigation graph of the site/portal. Locale usually refers to information related to both a language and a region (e.g., 'EN_US' may represent the English language and American formatting of time/date values, currency, etc. Based on various permutations of these variables, a set of pages may be generated or assembled from one or more templates. Content generation system 120 may assemble a set of pages from a template based upon different permutations of these variables. For example, if there are three possible values for Channel, three possible values for Locale, and three possible values for Display format, content generation system 120 may operate to assemble a set of twenty-seven web pages from a template based upon the various permutations of these variables. These twenty seven web pages can then be made accessible to content delivery system 110, which, in turn, can serve one of these to a user at client 100 in response to a user request. Thus, if a user requests a page on the basis of Locale, the user may get a variant or permutation of the page specific to the locale they requested. In one embodiment, if one of these pages does not correspond exactly to the locale, a user may get a variant of that page in which the value of Locale, which was used to generate of that variant, most closely matches the locale of the user.

Each of the permutations of the generated pages may also be translated to another format before delivery or being accessible to content delivery system 110. In this way, content delivery system 110 would be able to deliver a particular page of the generated content or page in a particular format in response to a request from a user.

Figure 6:
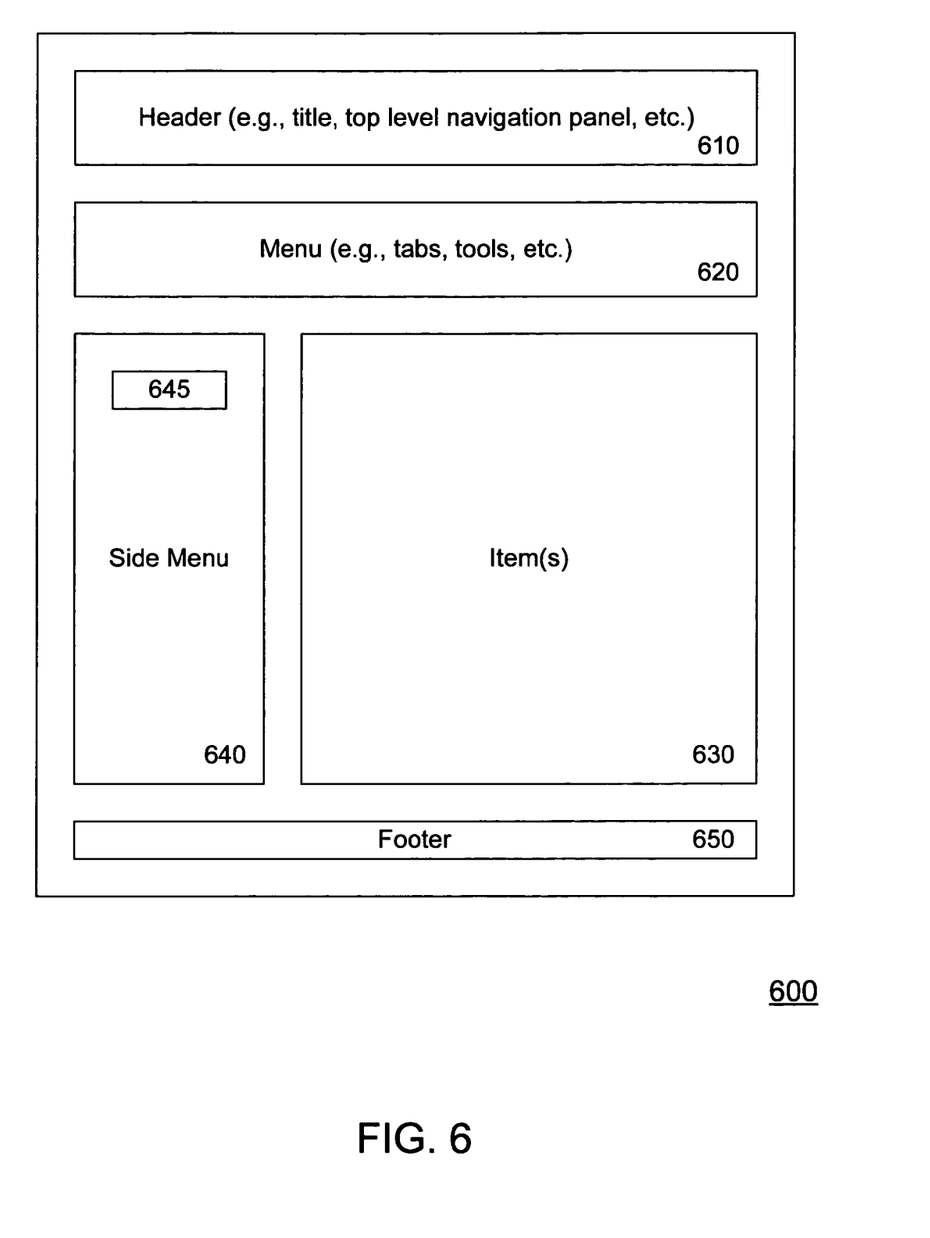
FIG. 6 is a simplified diagrammatic representation of an exemplary page on which dynamically provisioned content may be presented according to embodiments of the invention.

FIG. 6 is a simplified diagrammatic representation of exemplary page 600, according to one embodiment of the invention. As one skilled in the art can appreciate, a web or portal site could encompass a virtually unlimited number of pages, each of which may contain one or more features resembling page 600. In one embodiment, page 600 represents a portal page template comprising a plurality of display areas or sections represented by header 610, menu 620, item(s) 630, side menu 640, and footer 650. Within this disclosure, a section refers to an area of a template that contains managed content. Each area or section may, in turn, include one or more subsections or areas (e.g., input area 645). Page 600 may be utilized to build a starting portal site (e.g., Site 510) which may include one or more ways for content navigation. For example, header 610 and/or footer 650 may be implemented as a navigation tool bar or panel with a plurality of navigation items, each of which may be linked to another page internal or external to the website. In another example, side menu 640 could include a plurality of menu items, each of which may be a link to another page internal or external to the web site. In yet another example, a user may input a query for a particular content via input area 645. In response to the user query, the user may be presented with one or more content items via area 630 or a page internal or external to the website.

A portal or web site could be built in many ways based on page 600. For example, header 610 may contain the general, top-level navigation items available to the other key areas of the site and the rest of the areas may be driven by content. The top-level navigation panel or header may or may not be template driven. Further, each area may be linked to or driven by one or more software modules. For example, area 645 may be associated with a search utility, area 630 may be linked to area 645 for presenting results (e.g., categories of articles or products, channel links to content, featured article(s) or product(s), featured article(s) or product(s) by category, etc.) from a search inquiry, footer 650 may be associated with information presented in area 630 (e.g., "breadcrumbs" or related content items of a content item presented in area 630), etc.

As described above with reference to FIG. 2, a plurality of pages may be assembled or otherwise generated from page 600 based on a set of permutations of particular variables associated with page 600. The generated or assembled full HTML pages may then be pushed to the web tier (e.g., cached at web server 110) for delivery to end users.

In one embodiment, as described above with respect to the static solution, dependencies (e.g., associations and/or links) between these pages may be correspondingly tracked at the page level (e.g., via metadata residing on the filesystem, main memory, database, cache, etc.). As an example, suppose page 600 represents a portal page, if and when page 600 or any part thereof (e.g., an article posted in area 630, a headline posted in area 610, a tab presented in area 620, or a menu item shown in side menu 640, etc.) is updated or otherwise affected by a change (e.g., a content supervisor at device 150A modified the content of the article posted in area 630, the content supervisor being a company user authorized to work with managed content, content types, projects, channels, workflows, queries, etc.), content management system 140 may operate to notify or otherwise communicate this change to content generation system 120. Upon receiving notification of the change and based on its knowledge of the page dependencies, content generation system 120 correspondingly and dynamically re-generates page 600 with updated content and, where applicable, any and all pages that are affected by the change. The dynamically re-generated page(s) can then be pushed to the web tier for delivery to end users as described above (e.g., in response to a user query or per a predetermined schedule).

In one embodiment, as described above with respect to the dynamic solution, dependencies can be tracked at the fragment level (i.e., sub-page level). In this way, only fragments that are affected by the change(s) would need to be re-generated to account for the change(s) or update(s). Thus, following the above example, only the article posted in area 630 of page 600 and any fragments that are affected by the content supervisor's modification to the content of the article would need to be re-generated. Pages can then be re-assembled with the updated fragment on-the-fly (e.g., at content generation system 120) and pushed out to the web tier (e.g., web server or content delivery system 110). The out dated fragment may be invalidated as described above.

In one embodiment, the process of the dynamic provisioning of content may begin when content delivery system 110 receives a user request. Content delivery system 110 may be configured to pass all or some user requests to content generation system 120. This can be done in an automated fashion such that content generation system 120 may dynamically create, assemble, generate, or otherwise prepare a page that is personalized based on the request and a wide variety of context variables. Again, pages may be assembled from internal content managed by content management system 140 or external content from other data sources, all of which may change independently of one another.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. Accordingly, the scope of the invention should be determined by the following claims and their legal equivalents.

What is claimed is:

1. A system, comprising:
    a content generator; and
    a content manager communicatively connected to the content generator over a first network connection and a web server over a second network connection,
    the content manager being configured to:
        communicate to the content generator a change to a piece of content managed by the content manager, and
    the content generator being configured to:
        subsequent to the change to the piece of content being communicated and in response to a request for content received at the web server, dynamically and automatically regenerate any fragment that is managed by the content manager and that is affected by the change to the piece of content and dynamically and automatically regenerate any page that is associated with the fragment to account for the change to the piece of content; and
        communicate the page to the web server.

2. The system of claim 1, wherein the change to the piece of content is detected by or communicated to the content manager.

3. The system of claim 1, further comprising a user device communicatively connected to the content manager, the user device detecting the change to the piece of content and communicating the change to the piece of content to the content manager over a third network connection.

4. The system of claim 1, wherein the page contains internal content managed by the content manager and external content not managed by the content manager.

5. The system of claim 1, further comprising a database storing dependencies among all fragments managed by the content manager.

6. The system of claim 1, wherein the page that has been dynamically and automatically regenerated by the content generator to account for the change to the piece of content contains, in addition to the fragment, a plurality of fragments that are not affected by the change to the piece of content and that are not dynamically and automatically regenerated by the content generator to account for the change to the piece of content.

7. A computer program product comprising at least one non-transitory computer-readable medium storing instructions translatable by at least one processor, the instructions when executed by the at least one processor cause the at least one processor to perform:
    a content manager communicating to a content generator a change to a piece of content managed by the content manager, wherein the content manager is communicatively connected to the content generator and a content delivery system;
    subsequent to the change to the piece of content being communicated and in response to a request for content received at the content delivery system, the content generator dynamically and automatically regenerating any fragment that is managed by the content manager and that is affected by the change to the piece of content and dynamically and automatically regenerating any page that is associated with the fragment to account for the change to the piece of content; and the content generator communicating the page to the content delivery system over a network connection.

8. The computer program product of claim 7, wherein the page contains internal content managed by the content manager and external content not managed by the content manager.

9. The computer program product of claim 7, wherein the change to the piece of content is communicated to the content manager from a user device communicatively connected to the content manager over a different network connection.

10. The computer program product of claim 7, wherein the instructions when executed by the processor further cause the content manager to invalidate an outdated version of the fragment to account for the change to the piece of content.

11. The computer program product of claim 7, wherein the instructions when executed by the processor further cause the content manager to track dependencies among all fragments managed by the content manager.

12. The computer program product of claim 7, wherein the page that has been dynamically and automatically regenerated by the content generator to account for the change to the piece of content contains, in addition to the fragment, a plurality of fragments that are not affected by the change to the piece of content and that are not dynamically and automatically regenerated by the content generator to account for the change to the piece of content.

13. A method, comprising:
a content management system communicating to a content generation system a change to a piece of content managed by the content management system in a network environment, wherein the content management system is communicatively connected to the content generation system and a content delivery system;
subsequent to the change to the piece of content being communicated and in response to a request for content received at the content delivery system, the content generation system dynamically and automatically regenerating any fragment that is managed by the content management system in the network environment and that is affected by the change to the piece of content and dynamically and automatically regenerating any page that is associated with the fragment to account for the change to the piece of content; and
the content generation system communicating the page to the content delivery system over a network connection.

14. The method of claim 13, wherein the change to the piece of content is detected by or communicated to the content management system.

15. The method of claim 13, further comprising:
detecting the change to the piece of content at a user device communicatively connected to the content management system; and
communicating the change to the piece of content to the content management system over a different network connection.

16. The method of claim 13, wherein the page contains internal content managed by the content management system and external content not managed by the content management system.

17. The method of claim 13, further comprising interfacing the content management system, the content generation system, and the content delivery system in the network environment.

18. The method of claim 13, further comprising invalidating an outdated version of the fragment to account for the change to the piece of content.

19. The method of claim 13, further comprising tracking dependencies among all fragments managed by the content management system in the network environment.

20. The method of claim 13, wherein the page that has been dynamically and automatically regenerated by the content generation system to account for the change to the piece of content contains, in addition to the fragment, a plurality of fragments that are not affected by the change to the piece of content and that are not dynamically and automatically regenerated by the content generation system to account for the change to the piece of content.

* * * * *